(12) United States Patent
Zhu et al.

(10) Patent No.: US 11,479,000 B2
(45) Date of Patent: Oct. 25, 2022

(54) METHOD FOR MAKING UNIDIRECTIONAL CONTINUOUS FIBER-REINFORCED THERMOPLASTIC COMPOSITE MATERIAL

(71) Applicant: JIANGSU QIYI TECHNOLOGY CO., LTD, Danyang (CN)

(72) Inventors: Huaping Zhu, Danyang (CN); Yufei Tian, Danyang (CN); XiaoJian Wo, Danyang (CN)

(73) Assignee: JIANGSU QIYI TECHNOLOGY CO., LTD, Danyang (CN)

( * ) Notice: Subject to any disclaimer, the term of this patent is extended or adjusted under 35 U.S.C. 154(b) by 0 days.

(21) Appl. No.: 17/674,376

(22) Filed: Feb. 17, 2022

(65) Prior Publication Data

US 2022/0168975 A1  Jun. 2, 2022

Related U.S. Application Data

(60) Division of application No. 17/478,481, filed on Sep. 17, 2021, now Pat. No. 11,396,146, and a
(Continued)

(30) Foreign Application Priority Data

Jul. 10, 2020 (CN) .......................... 202010662080.2

(51) Int. Cl.
*B29C 70/50* (2006.01)
*B29C 70/52* (2006.01)
(Continued)

(52) U.S. Cl.
CPC ............ *B29C 70/521* (2013.01); *B29C 70/20* (2013.01); *B29C 70/528* (2013.01); *B29C 70/545* (2013.01); *B29K 2101/12* (2013.01)

(58) Field of Classification Search
CPC ...... B29C 70/506; B29C 70/504; B29C 70/20
See application file for complete search history.

(56) References Cited

U.S. PATENT DOCUMENTS 3,058,863 A * 10/1962 Arbit ....................... B29C 70/50
156/244.11
3,222,237 A * 12/1965 McKelvy .............. B29C 70/506
428/110
(Continued)

FOREIGN PATENT DOCUMENTS

CN          1139398 A      1/1997
CN          104228087 A    12/2014
(Continued)

OTHER PUBLICATIONS

English Translation of CN104827645A from Google Patents (2022), 4 pages. (Year: 2022).*

*Primary Examiner* — Matthew J Daniels
(74) *Attorney, Agent, or Firm* — Wayne IP LLC

(57) ABSTRACT

Disclosed herein a method for making a unidirectional continuous fiber-reinforced resin composite material. A resin plasticized and molten by an extruder is transported to a coating guide roller through a die head, and a hot-melt resin film layer with uniform thickness is formed on a roller surface of the coating guide roller. Simultaneously, the coating guide roller guides the hot-melt resin to continuously and uniformly coat on a row of flattened unidirectional continuous fibers along the roller surface of the coating guide roller. Subsequently, the coated flattened unidirectional continuous fibers pass through an open dip-coating roller device to effectively combine with the hot-melt resin to obtain a composite material of the hot-melt resin and fibers, which passes through a cooling and forming device to
(Continued)

a winder under a driving force of a main traction to obtain the unidirectional continuous fiber-reinforced resin composite material.

2 Claims, 7 Drawing Sheets

Related U.S. Application Data continuation of application No. PCT/CN2020/104975, filed on Jul. 10, 2020.

(51) Int. Cl.
  *B29C 70/54* (2006.01)
  *B29C 70/20* (2006.01)
  *B29K 101/12* (2006.01)

(56) References Cited

U.S. PATENT DOCUMENTS

| | | | | |
|---|---|---|---|---|
| 3,691,009 A | * | 9/1972 | Opderbeck | D21H 15/06 19/66 T |
| 4,495,017 A | * | 1/1985 | Abe | B29C 70/50 156/181 |
| 5,277,566 A | * | 1/1994 | Augustin | B29B 15/122 264/171.23 |
| 5,445,701 A | * | 8/1995 | Koba | B29C 70/504 118/118 |
| 5,532,054 A | * | 7/1996 | Koba | B29B 15/122 428/407 |
| 5,665,295 A | * | 9/1997 | Takamoto | B29C 44/5618 264/172.19 |
| 5,755,900 A | * | 5/1998 | Weir | B32B 5/22 156/244.27 |
| 9,233,486 B2 | | 1/2016 | Regan et al. | |
| 9,289,936 B2 | | 3/2016 | Eastep et al. | |
| 2003/0148087 A1 | * | 8/2003 | Hogfors Ziebell | D04H 11/00 428/297.4 |
| 2004/0135285 A1 | * | 7/2004 | Brussel | B29C 70/54 425/363 |
| 2006/0087059 A1 | * | 4/2006 | Boissonnat | B29C 48/15 264/555 |
| 2012/0251823 A1 | * | 10/2012 | Maldonado | B29C 43/28 428/394 |
| 2018/0250849 A1 | * | 9/2018 | Samejima | D02J 1/18 |

FOREIGN PATENT DOCUMENTS

| | | |
|---|---|---|
| CN | 204414414 U | 6/2015 |
| CN | 104827645 A | 8/2015 |
| CN | 105346200 A | 2/2016 |
| CN | 105666897 A | 6/2016 |
| CN | 108724525 A | 11/2018 |
| JP | 2008246872 A | 10/2008 |
| WO | 2012149122 A1 | 11/2012 |
| WO | 2014138965 A1 | 9/2014 |

\* cited by examiner

METHOD FOR MAKING UNIDIRECTIONAL CONTINUOUS FIBER-REINFORCED THERMOPLASTIC COMPOSITE MATERIAL

CROSS-REFERENCE TO RELATED APPLICATIONS

This application is a divisional application of U.S. patent application Ser. No. 17/478,481, filed on Sep. 17, 2021, which claims the benefit of priority from Chinese Patent Application No. 202010662080.2, filed on Jul. 10, 2020. The content of the aforementioned applications, including any intervening amendments thereto, is incorporated herein by reference in its entirety.

TECHNICAL FIELD

The application relates to continuous fiber-reinforced thermoplastic composite materials, and more particularly to a method for making a continuous fiber-reinforced thermoplastic composite material.

BACKGROUND

Traditional metal materials are gradually replaced by various fiber-reinforced resin composite materials, which are widely used in many fields that require lightweight, such as airplanes, automobiles and other transportation vehicles.

With the development and application of fiber-reinforced thermoplastic composite materials, continuous fiber-reinforced thermoplastic material impregnated tapes have gradually been promoted due to their excellent physical properties and diverse processing and molding methods, and widely used in transportation, military and civil aviation, petrochemical industry, sports equipment and building materials. Products made by this material have light weight, high strength and desirable corrosion resistance, and are recyclable and convenient to process and mold. The excellent comprehensive performance of such material promotes the vigorous development of related industries.

Characteristic indicators for evaluating the mechanical and physical properties of the continuous fiber reinforced resin composite materials includes fusion effectiveness of the fiber and resin, distribution uniformity of continuous fibers along the width direction of the product and product thickness. Currently, in addition to the coupling agent treatment of the resin at the material level to enhance the connection strength with the fiber interface, two processing methods are also adopted to improve the performance indicators One is to pass the fiber through a closed mold with a built-in cavity containing the hot-melt resin to fuse the fiber and resin. For such process method, there are untouched areas in the mold, which can easily cause thermal decomposition of the melt. The reconnection of fibers after breakage is difficult, resulting in large fluctuations in the fiber content of the continuous fiber thermoplastic prepreg tape. Meanwhile, the thickness adjustment of the product is affected by the die gap, reducing the versatility of the production equipment. In addition, the fusion effect of fiber and resin is limited by the speed of the production line, leading to a low production efficiency. The other is to heat and melt a formed thermoplastic film to wrap and combined with the fiber. Unfortunately, the size shrinkage of the thermoplastic film during the heating process influences uniform distribution of the product resin. In addition, the secondary processing of reheating the resin film is uneconomic, and the product is not cost-effective. Due to the limitation of the processing methods mentioned above, a secondary processing such as extrusion, hot pressing and injection molding will have a direct impact on the mechanical properties of the products that use fiber-reinforced resin as the raw material, causing resulting in unstable performance and early failure of the product in actual use.

U.S. Pat. Nos. 9,233,486B2 and 9,289,936B2 of TICONA LLC (US) disclose the process method that passes the fiber through a closed mold with a built-in cavity containing the hot-melt resin to fuse the fiber and resin. Due to the design feature of the closed mold, there are untouched areas in the built-in cavity of the mold, easily causing an accumulation of hot-melt resin and resulting in thermal decomposition of the melt. The reconnection of fibers after breakage is difficult, resulting in large fluctuations in the fiber content of the continuous fiber thermoplastic prepreg tape. Meanwhile, the thickness adjustment of the product is affected by the die gap, reducing the versatility of the production equipment. In addition, the fusion effect of fiber and resin is limited by the speed of the production line, leading to a low production efficiency.

Chinese patent publication No. 105346200A of Shaanxi Tiance Tech Co., Ltd directly combines a cured thermoplastic resin film with continuous fibers through a hot press roll. Due to the poor fluidity of the thermoplastic resin and undesirable hot melt effect of the hot roll press, the infiltration effect of the thermoplastic resin on the continuous fiber is poor, leading to the unsatisfactory infiltration effect of the continuous fiber-reinforced thermoplastic resin composite material, poor interface effect and low material strength. Meanwhile, the size shrinkage of the thermoplastic film during the heating process influences uniform distribution of the product resin. In addition, the secondary processing of reheating the resin film is uneconomic, and the product is not cost-effective.

A method for making a unidirectional continuous fiber-reinforced thermoplastic composite material is provided herein. Rollers with special geometric arrangement for flattening fibers using tension, mechanical electrostatic flattening and resin coating with rollers staggered up and down are designed to effectively combine the fiber and resin, and prepare a composite material product with uniformly distributed continuous fibers and a stable size and thickness.

SUMMARY

In order to achieve the above object, the present disclosure provides a method for making a unidirectional continuous fiber-reinforced resin composite material. Open dip-coating is adopted to combine a hot-melt resin with fibers. A resin plasticized and molten by an extruder is transported to a coating guide roller through a die head, and a hot-melt resin film layer with uniform thickness is formed on a roller surface of the coating guide roller. Simultaneously, the coating guide roller guides the hot-melt resin to continuously and uniformly coat on a row of flattened unidirectional continuous fibers along the roller surface of the coating guide roller. Subsequently, the coated flattened unidirectional continuous fibers pass through an open dip-coating roller device to effectively combine with the hot-melt resin to obtain a composite material of the hot-melt resin and fibers. The composite material of the hot-melt resin and fibers then passes through a cooling and forming device to a winder under a driving force of the main traction to obtain the unidirectional continuous fiber-reinforced resin composite material.

The technical solutions of the present disclosure are described as follow.

In a first aspect, the present disclosure provides equipment for making a unidirectional continuous fiber-reinforced resin composite material, comprising:

a coating guide roller;

an open dip-coating roller device; and an extrusion die;

wherein the open dip-coating roller device comprises a plurality of triangle-shaped dip-coating units arranged alternately and parallelly;

the extrusion die is configured to extrude and coat a hot-melt resin on a surface of the coating guide roller to form a hot-melt resin film with uniform thickness; and the coating guide roller is configured to rotate to synchronously coat the hot-melt resin film on a surface of the coating guide roller to flattened unidirectional continuous fibers arranged in a row.

In some embodiments, after being preliminarily combined with the hot-melt resin, the flattened unidirectional continuous fibers enter the open dip-coating roller device to fully combine with the hot-melt resin;

In some embodiments, the coating guide roller and the extrusion die are arranged at a side of the flattened unidirectional continuous fibers.

In some embodiments, a first coating guide roller and a first extrusion die are arranged at a top side of the flattened unidirectional continuous fibers; a second coating guide roller and a second coating guide roller are arranged at a bottom side of the flattened unidirectional continuous fibers;

the first extrusion die is configured to extrude and coat the hot-melt resin that is on a surface of the first coating guide roller onto form a first hot-melt resin film with uniform thickness; and the second extrusion die is configured to extrude and coat the hot-melt resin on a surface of the second coating guide roller to form a second hot-melt resin film with uniform thickness; and the first coating guide roller is configured to rotate to coat the first hot-melt resin film that is on a surface of the first coating guide roller onto the top side of the flattened unidirectional continuous fibers; and the second coating guide roller is configured to rotate to coat the second hot-melt resin film on a surface of the second coating guide roller to the bottom side of the flattened unidirectional continuous fibers.

In some embodiments, a first extrusion die and a coating guide roller are arranged at a top side of the flattened unidirectional continuous fibers; a second extrusion die is arranged at a bottom side of the flattened unidirectional continuous fibers.

the coating guide roller is configured to rotate to coat a hot-melt resin film on a surface of the coating guide roller to the top side of the flattened unidirectional continuous fibers; and the second extrusion die is configured to coat uniformly the hot-melt resin on the bottom side of the flattened unidirectional continuous fibers.

In some embodiments, a reference surface of an exit of the extrusion die is parallel to an axis of the coating guide roller; a setting range of a gap between the exit of the extrusion die and the surface of the coating guide roller is 0.1-10 mm; and a setting range of an angle between the extrusion die and a horizontal plane is 10-150°.

In some embodiments, a wrap angle between the flattened unidirectional continuous fibers and the coating guide roller is 15-180°.

In some embodiments, the coating guide roller is driven independently; a rotation speed of the coating guide roller is set independently; a thickness of the hot-melt resin film formed on the surface of the coating guide roller and an amount of the hot-melt resin coated on the flattened unidirectional continuous fibers are controlled by adjusting the rotation speed of the coating guide roller and an extrusion amount of the hot-melt resin; a roller-surface linear speed of the coating guide roller is small than a running speed of the flattened unidirectional continuous fibers passing through the coating guide roller, which is conducive for forming a hot-melt resin film with uniform thickness; and if the roller-surface linear speed of the coating guide roller is the same as the running speed of the flattened unidirectional continuous fibers passing through the coating guide roller, fibers are easy to entangle on the coating guide roller.

In some embodiments, the open dip-coating roller device comprises a plurality of triangle-shaped dip-coating units arranged alternately and parallelly; each of the plurality of triangle-shaped dip-coating units comprises three dip-coating rollers; the three dip-coating rollers are parallel to each other along an axial direction of each of the three dip-coating rollers; according to an arrangement of the three dip-coating rollers, the plurality of triangle-shaped dip-coating units includes an upright-triangle dip-coating unit and an inverted-triangle dip-coating unit; and the upright-triangle dip-coating unit and the inverted-triangle dip-coating unit are arranged alternately and parallelly.

In some embodiments, a center distance of the three dip-coating rollers in each of the plurality of triangle-shaped dip-coating units is adjusted through adjusting a position of a middle dip-coating roller of the three dip-coating rollers; and a wrap angle of the flattened unidirectional continuous fibers and the dip-coating roller are adjusted through adjusting the center distance of the three dip-coating rollers; and wraps angles between dip-coating units and the flattened unidirectional continuous fibers are large to small, which is called a decreasing state; whereas a tension of each roller of the dip-coating unit is gradually increasing. Such mechanical characteristic is consistent with a fusion pressure required for fusing the hot-melt resin to the flattened unidirectional continuous fibers from inside to outside.

In some embodiments, a setting range of a wraps angle between each dip-coating unit and the flattened unidirectional continuous fibers are 15-180°; a roller-surface linear speed of the dip-coating roller is small than a running speed of the flattened unidirectional continuous fibers passing through the dip-coating roller; and if the roller-surface linear speed of the dip-coating roller is the same as the running speed of the flattened unidirectional continuous fibers passing through the dip-coating roller, fibers are easy to entangle on the dip-coating roller.

In some embodiments, a center distance of the three dip-coating rollers in each of the plurality of triangle-shaped dip-coating units is adjusted to adjust a gap between a roller surface of the middle dip-coating roller and a roller surface of a dip-coating roller adjacent to the middle dip-coating roller of the three dip-coating rollers in each of the plurality of triangle-shaped dip-coating units; the gap between a roller surface of the middle dip-coating roller and a roller surface of a dip-coating roller adjacent to the middle dip-coating roller of the three dip-coating rollers in each of the plurality of triangle-shaped dip-coating units is 0.1-15 mm; a suitable tension of the flatten unidirectional continuous fibers to effectively combine with the hot-melt resin and a pressure of the hot-melt resin into the flatten unidirectional continuous fibers are obtained by adjusting the center distance and gaps among the three dip-coating rollers in each of the plurality of triangle-shaped dip-coating units.

In some embodiments, a rotating support pair is provided at two ends of the middle dip-coating roller of the three dip-coating rollers in each of the plurality of triangle-shaped dip-coating units; the rotating support pair is connected to a linearly movable transmission pair to independently adjust the center distance of the three dip-coating rollers in each of the plurality of triangle-shaped dip-coating units; a shaft head at a transmission side of each coating roller of the three dip-coating rollers is provide with a sprocket or a gear to transmit a rotating movement; and a rotation speed is controlled by a control device.

In some embodiments, a heating structure is provided in the coating guide roller and in each of the three dip-coating rollers in each of the plurality of triangle-shaped dip-coating units; the heating structure is an electric heating element or a liquid heating medium such as heat transfer oil; an end of a shaft head on a transmission side is connected to an external heat source.

In some embodiments, a top side and a bottom side of the open dip-coating roller device are respectively provided with a plurality radiation heating devices to provide heat for effectively combining the hot-melt resin with the flattened unidirectional continuous fibers when passing through the open dip-coating roller device, lowering down an extrusion temperature of the extrusion mode, such that the extrusion temperature is the same as a coating temperature, avoiding a resin deposition caused by too high initial temperature.

In some embodiments, the equipment further comprises a flattening unit; the flattening unit comprises a yarn-passing part and a reinforcement part; and a wrap angle is formed between a row of unidirectional continuous fibers and the yarn-passing part in contact with the row of unidirectional continuous fibers.

In some embodiments, the equipment further comprises a flattening unit; the flattening unit comprises three yarn-passing assemblies; two of the three yarn-passing assemblies are fixed in place; one of the three yarn-passing assemblies has an adjustable position; one of the three yarn-passing assemblies has an adjustable position; and the three yarn-passing assemblies are arranged in a V-shaped structure;

the yarn-passing part of a middle yarn-passing assembly of the three yarn-passing assemblies is capable of moving up and down to adjust a center distance of the three yarn-passing assemblies to change a wrap angle of a passing fiber and the yarn-passing part, so as to adjust a tension of the passing fiber;

the reinforcement part is arranged at a back of the yarn-passing part; the reinforcement part are provided with a plurality of lifting parts; and the plurality of lifting parts are configured to adjust an arching degree of the yarn-passing part and fixedly connect the yarn-passing part to the reinforcement part.

In some embodiments, the plurality of lifting parts are configured to adjust an arching degree of the yarn-passing part along a vertical direction of a geometric generatrix of the yarn-passing part and fix the yarn-passing part; a setting range of the arching degree or a chord height based on a process centerline of production equipment is 0.05-5.0 mm.

In some embodiments, a cross-sectional geometric curve of a contact area between the yarn-passing part and continuous fibers in a wrap angle manner is of a semicircle shape, a partial-arc shape, a full-circle shape or a SIGN-curve shape.

In some embodiments, a heating structure is arranged in the yarn-passing part; and the heating structure is an electric heating element or a liquid heating medium.

In some embodiments, the equipment further comprises a friction fiber electrification device; the friction fiber electrification device comprises a friction part and an electrification device; a material of the friction part is different with that of fibers; the electrification device is configured to generate same kind of charges through a friction to the fibers; and the material of the friction part is copper, steel, aluminum alloy, ceramic, nylon or hard rubber;

the friction part is configured to perform a repeated contact friction movement on a surface of the flattened unidirectional continuous fibers through an actuator to allow two adjacent fibers to generate the same kind of charges, so as to generate a repulsive force between the two adjacent fibers to further flatten the flattened unidirectional continuous fibers;

a head of the friction part in contact with the surface of the flattened unidirectional continuous fibers is of a spherical shape, a hemispherical shape, a partially-spherical shape, a cylinder shape, a semi-cylinder shape, a continuous three-dimensional geometric surface or continuous two-dimensional geometric surface; and the actuator is an electric driving element, a pneumatic driving element or a hydraulic driving element.

In a second aspect, the present disclosure provides a method for making a unidirectional continuous fiber-reinforced thermoplastic composite material, comprising:

S1: loading a plurality of continuous fiber bundles on a carding device through a yarn-releasing rotating shaft configured to adjust a tension of each continuous fiber respectively; and subjecting the plurality of fiber bundles to fluffing through the heating mechanism; wherein the yarn-releasing rotating shaft is arranged on the creel;

S2: spreading the plurality of continuous fiber bundles through a flattening device and a fiber-scraping static-electricity generating device;

S3: extruding a hot-melt resin through the extrusion die and coating the hot-melt resin on the coating guide roller to form a hot-melt resin film with uniform thickness on the coating guide roller;

S4: rotating the coating guide roller; and coating the hot-melt resin film on the flattened unidirectional continuous fibers;

S5: passing the flattened unidirectional continuous fibers through the open dip-coating roller device to fully combine the flattened unidirectional continuous fibers with the hot melt resin; and S6: passing the flattened unidirectional continuous fibers through a cooling and forming device under a driving force of a main traction to obtain a rollable unidirectional continuous fiber-reinforced thermoplastic composite material.

In some embodiments, in step S6, after being cooled and formed, the unidirectional continuous fiber-reinforced thermoplastic composite material is drawn through a longitudinal cutting device, and is evenly cut along a width direction; and the cut unidirectional continuous fiber-reinforced thermoplastic composite material passes through a transverse cutting device, and is cut down according to a set length to obtain a unidirectional fiber-reinforced resin sheet with the set length.

The beneficial effects of the present disclosure are described as follows. A unidirectional continuous fiber-reinforced resin composite material is prepared, in which fibers and resin are effectively combined. The continuous fibers are uniformly distributed. The size and thickness of the composite material is stable.

Figure 1:
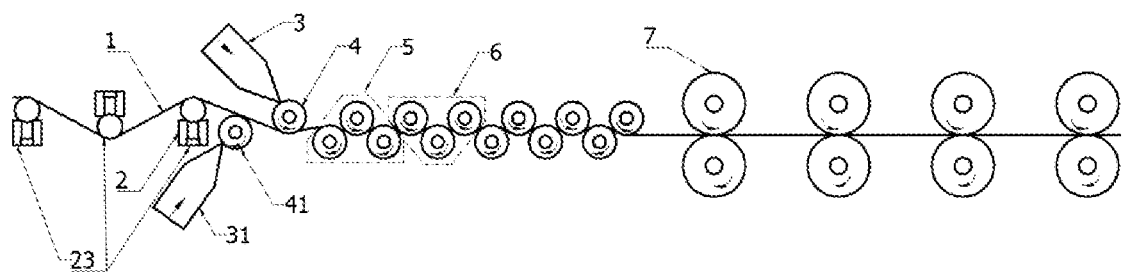
FIG. 1 schematically depicts that extrusion dies and coating guide rollers are arranged at two side of a continuous fiber in accordance with an embodiment of the present disclosure.

In the drawings, 1, continuous fiber; 2, flattening unit; 21, first flattening unit; 22, second flattening unit; 23, third flattening unit; 24, yarn-passing part; 25, reinforcement part; 26, jack-up mechanism; 3, extrusion die; 31, extrusion die; 4, coating guide roller; 41, coating guide roller 5, upright-triangle dip-coating unit; 6, inverted-triangle dip-coating unit; 7, cooling device; 80, creel; 81, carding frame; 82, heating mechanism; 83, friction fiber electrification device; 84, trimming knife; 85, traction device; 86, transition roller; 87, winding device; 88, friction part; 89, reciprocating motion mechanism; 90, support; 91, linear motion pair; 92, bearing socket; 93, sprocket; 94, rack; 95, adjustment device; 96, longitudinal cutting device; and 97, transverse cutting device.

DETAILED DESCRIPTION OF EMBODIMENTS

The present disclosure will be further described below with reference to the embodiments. The embodiments provided herein are preferred embodiments, and not intended to limit this disclosure.

Embodiment 1

Figure 4:
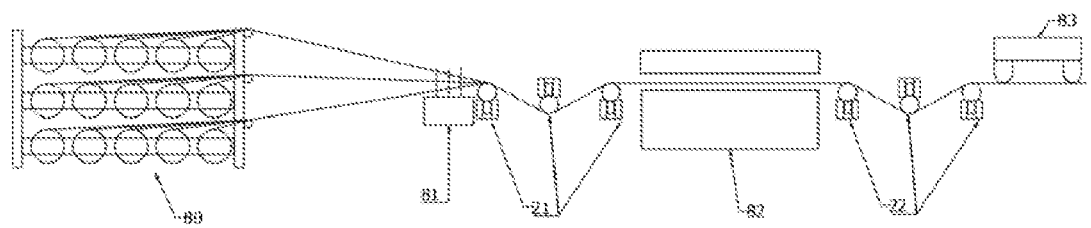
FIG. 4 schematically depicts a structure of equipment for making a unidirectional continuous fiber-reinforced thermoplastic composite material in accordance with an embodiment of the present disclosure.
Figure 4:
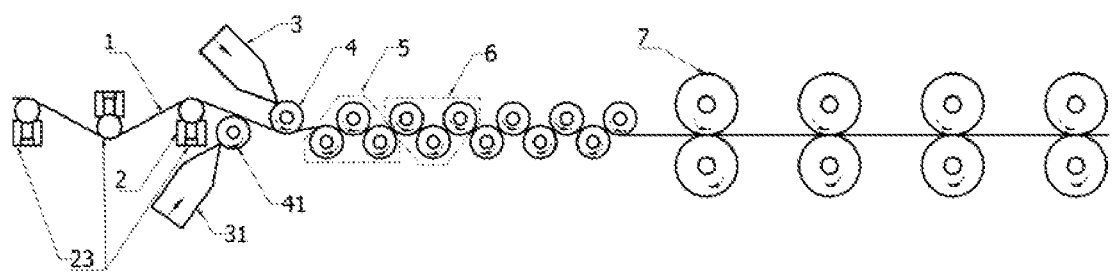
Figure 4:
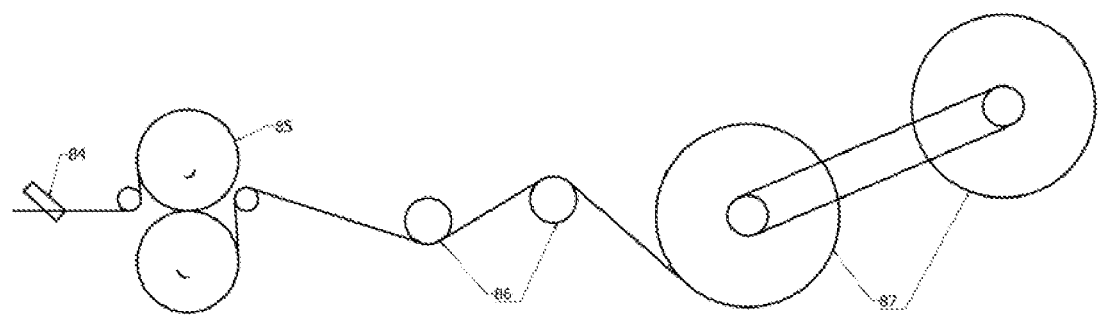

As shown in FIG. 4, a plurality of continuous fiber rolls are loaded on a creel 80, and each continuous fiber 1 of the plurality of continuous fiber rolls is pulled to a carding frame 81 and arranged in a row. The continuous fibers 1 pass through a first flattening unit 21 to initially disperse such that the continuous fibers 1 are leveled in a same horizontal plane. The continuous fibers 1 then pass through a heating mechanism 82 to be fluffy, which is conducive to further flattening. After moving out from the heating mechanism 82, the continuous fibers 1 enter a second flattening unit 22, and then pass through a friction fiber electrification device 83 and a third flattening unit 23. At this time, the continuous fibers 1 are dispersed to a desired effect, and are ready for being coated with a resin.

After being heater by an extruder, a thermoplastic resin is extruded through an extrusion die 4, and poured on a coating guide roller as a waterfall-like film. The continuous fibers 1 pass through the extrusion die 4, and contact with the extrusion die 4 with a wrap angle. The continuous fibers 1 are combined with the thermoplastic resin uniformly distributed on the extrusion die 4, and pass through an open dip-coating roller device to obtain a molten product in which the continuous fibers 1 and the resin are fully combined. The open dip-coating roller device includes a plurality of upright-triangle dip-coating units 5 and a plurality of inverted-triangle dip-coating units 6, and the upright-triangle dip-coating units 5 and the inverted-triangle dip-coating units 6 are arranged alternately and parallelly. The molten product is then cooled through a cooling device 7, and removes an edge through a trimming knife 84, and then passes through a traction device 85, a transition roller 86 and a winding device 87 to obtain a final product of a unidirectional continuous fiber-reinforced thermoplastic prepreg coil.

In this embodiment, the continuous fiber is a 362CYF 2400TEX non-twisted continuous fiber produced by China Jushi Co., Ltd. (Zhejiang, China). A main raw material of the resin includes a polypropylene (PP), a compatibilizer and an additive agent. The polypropylene has a melt index of 50-110 g/10 min. The compatibilizer is 10% by weight of the polypropylene, and is used to increase a bonding strength of the polypropylene (PP) and glass fiber. A main component of the compatibilizer is grafted maleic anhydride. The additive agent is an antioxidant, and is 3% by weight of the polypropylene. It should be noted that the continuous fiber is not limited by the fiber provided herein, and for example, it can be a glass fiber, a carbon fiber and an aramid fiber; the thermoplastic resin is limited by the resin provided herein, and for example, it can be a polypropylene (PP), a polyethylene (PE), a polyester (PET), a polyamide PA6, a polyamide PA66, a polycarbonate (PC), a polyetheretherketone (PEEK) and a polyphenylene sulfide (PPS); and the additive agent can be an antioxidant, a UV absorber, a light stabilizer and a lubricating additives.

In this embodiment, each continuous fiber roll arranged on the creel 80 is provided with a tension control device, which can individually adjust the tension of a single roll of fiber or the overall tension. A height of the creel 80 along a longitudinal direction of equipment is adjustable.

In this embodiment, the carding frame 81 is a device similar to a comb. Each fiber passes through a gap. After being pulled out from the creel 80 and passing through the carding frame 81, each fiber is fixed in a width direction, such that the continuous fibers are uniformly arranged in a row.

Figure 6:
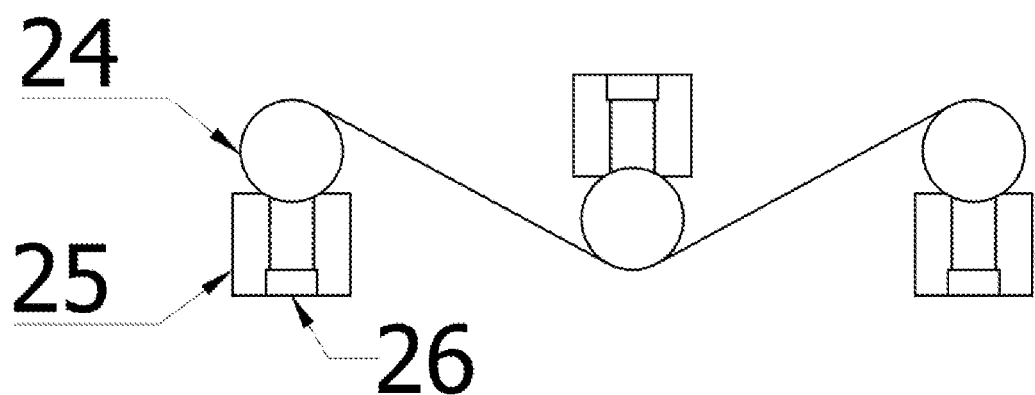
FIG. 6 is a front view of a flattening unit in accordance with an embodiment of the present disclosure.
Figure 7:
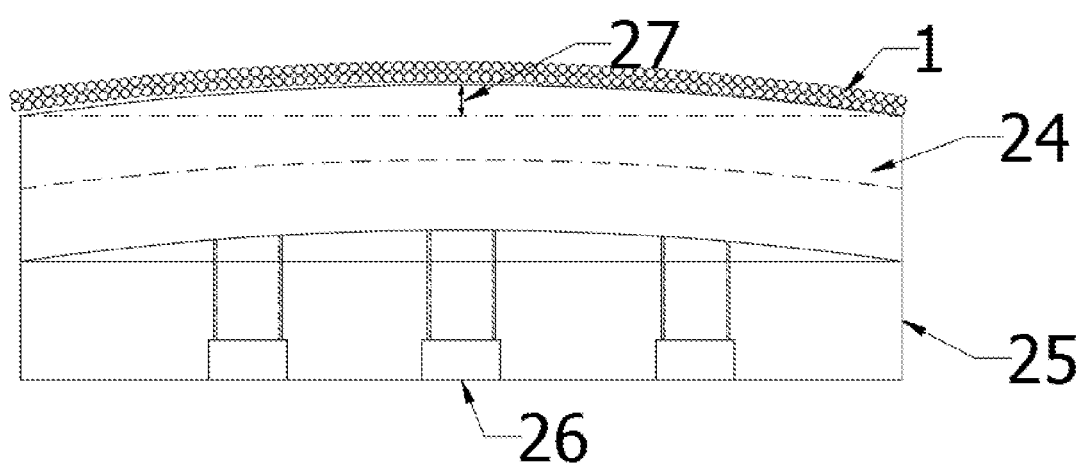
FIG. 7 is a side view of the flattening unit in accordance with an embodiment of the present disclosure.
Figure 8:
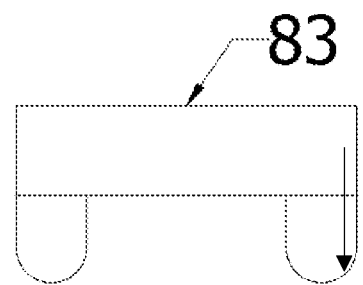
FIG. 8 is a front view of a friction fiber electrification device in accordance with an embodiment of the present disclosure.
Figure 9:
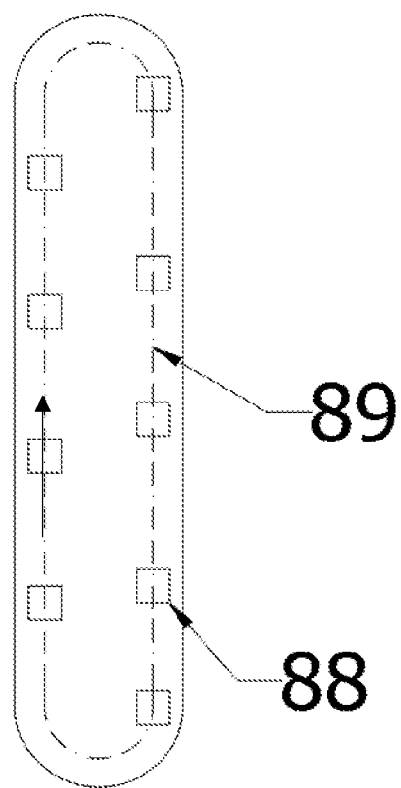
FIG. 9 is a top view of the friction fiber electrification device in accordance with an embodiment of the present disclosure.

As shown in FIGS. 6-7, in this embodiment, three flattening units are provided, which include the first flattening unit 21, the second flattening unit 22 and the third flattening unit 23. Each flatting unit includes three yarning passing parts 24 contacting with the continuous fiber in a certain warp angle and three reinforcement parts 25 corresponding to the three yarning passing parts 24. A heating structure is arranged in the yarn-passing part, and the heating structure is an electrical heating element. A heating temperature is 80-110° C. The reinforcement part 25 is provided with a plurality of jack-up mechanisms 26. The plurality of jack-up mechanisms 26 are supported by the reinforcement part 25, and are configured to adjust an arching degree of the yarn-passing part 24 and fixedly connect the yarn-passing part 24 to the reinforcement part 25. In this embodiment, the arching degree is a distance between a roller surface of the yarn-passing part at an intermediate position and the reinforcement part after arching, and is adjusted to 1 mm. In addition, in each flattening unit, a middle yarn-passing part 24 can move up and down, and the other two middle yarn-passing parts 24 are fixed. The three yarn-passing parts 24 are arranged in a V-shaped structure. By moving the middle yarn-passing part 24, center distances among the three yarn-passing parts 24 are adjusted, changing a warp angle of a passing fiber and the flattening unit to adjust a tension of the passing fiber. A principle of adjusting the tension and a size of the adjustment are calculated as follows.

Figure 5:
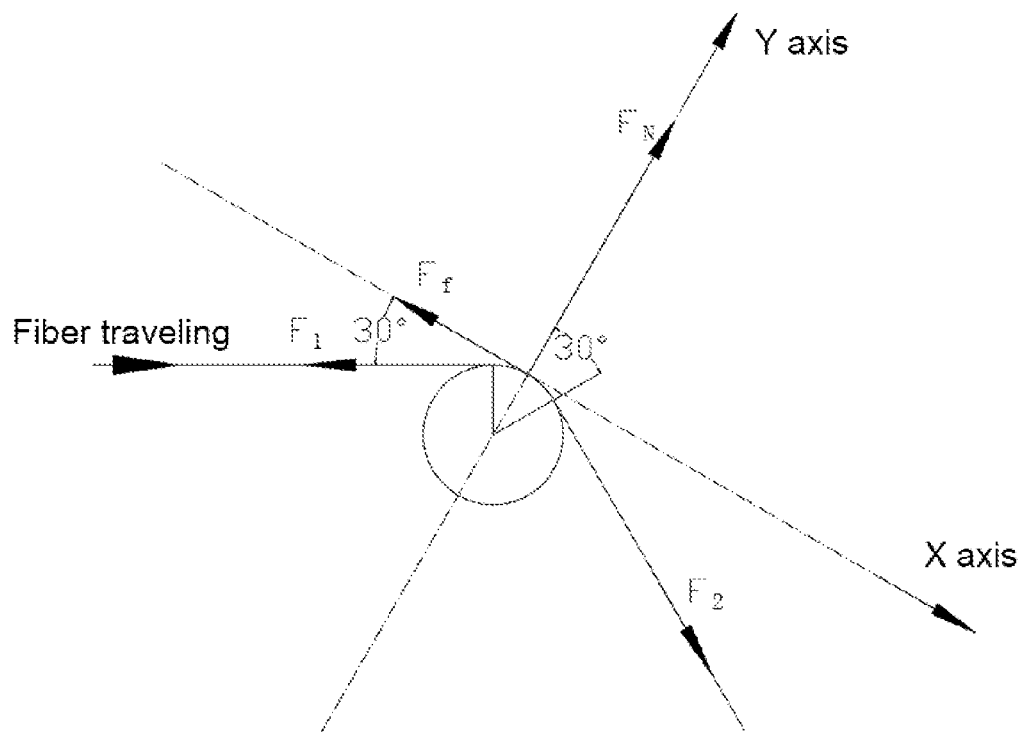
FIG. 5 a force analysis diagram of a tension change of a fiber before and after passing through a flattening roller in accordance with an embodiment of the present disclosure.

FIG. 5 is a force analysis diagram of a tension change of a fiber before and after passing through a flattening roller.

A contact part between a fiber and a roller is regarded as a point (an intersection of an X-axis and a Y-axis), and its mechanical properties are analyzed as follows. $F_1$ is a tension along a direction that the fiber moves towards the roller; $F_2$ is a tension along a direction that the fiber moves away from the roller; $F_N$ is a supporting force of the roller to the fiber; $F_f$ is a frictional force of the roller to the fiber, and a direction of the $F_f$ is shown in FIG. 5. A half of a wrap angle of the fiber on the roller is defined as θ, that is, the angle of 30° shown in FIG. 5.

The frictional force:

$$F_f = \mu FN \quad (1);$$

in which μ is the coefficient of friction.

Each force is projected on the X axis, and a formula (2) is obtained:

$$F_2 \cos\theta = F_1 \cos\theta + Ff \quad (2).$$

Each force is projected on the Y axis, and a formula (3) is obtained:

$$F_2 \sin\theta + F_1 \sin\theta = F_N \quad (3).$$

It is defined that the tension of the fiber moving away from the roller is k times the tension of the fiber moving towards roller, that is:

$$F_2 = kF_1 \quad (4).$$

According to the formulas (1)-(4), a formula (5) is obtained:

$$k = \frac{\cos\theta + \mu\sin\theta}{\cos\theta - \mu\sin\theta}. \quad (5)$$

Since a group of V-shaped rollers have 3 rollers, the tension increases by $k^3$ times after passing through a group of rollers.

θ is taken as 30°, that is, the wrap angle is 60°. A friction coefficient between a glass fiber and steel is about 0.2 according to literatures. The friction coefficient provided herein is taken as 0.3, and thus k=1.26, $k_3$=2.0. Therefore, when a fiber passes through a group of rollers that each wrap angle of the fiber to the roller is 60°, a tension of the fiber increases by about two times.

According to the above calculation, it can be seen that a tension of a fiber will increase by about two times after passing through each flattening unit. After passing through three flattening units, the tension of the fiber will be almost eight times that before the fiber passes through the three flattening units. It conforms to the principle of gradual dispersion, and is also suitable for the subsequent coating process of the dip-coating units. With the gradual increase of tension, the wettability of the fiber and resin is gradually improved.

In this embodiment, the heating mechanism 82 produces heat in an infrared heating way. The heating mechanism 82 is provided with a plurality of ceramic infrared heaters. A total length of the heating mechanism 82 is about 1 m. A width of the heating mechanism 82 is larger than a total width of the continuous fibers being dispersed. The heating mechanism 82 is kept a distance of 1-10 cm away from a surface of the continuous fibers, and a maximum heating temperature of the heating mechanism 82 is 490° C.

In this embodiment, the friction fiber electrification device 83 is arranged between the second flattening unit 22 and the third flattening unit 23, and the friction fiber electrification device 83 includes a friction part 88 and a reciprocating motion mechanism 89. The friction part 88 provided herein is a copper block. The copper block reciprocates frictionally on a surface of a row of flattened unidirectional continuous fibers. A design principle is to make the row of flattened unidirectional continuous fibers 1 have the same kind of electric charge through friction, and generate a repulsive force between adjacent fibers that generate the same kind of charge, so as to improve dispersion uniformity of the continuous fibers. A geometric structure of a head of the copper block in contact with a surface of the flattened fibers is of a quarter-spherical shape similar to a shape of a fingertip. In addition, the reciprocating motion mechanism 89 is driven by a motor.

As shown in FIG. 1, in this embodiment, a temperature of the extruder including a screw part, a melt pump, a connection part connected to the extrusion die and the extrusion die 3 is 190-270° C. As the temperature increases, a melt flow rate of the resin will increase. The increase in the melt flow rate is conducive to the infiltration of fibers in the resin, but too high temperature will cause the resin to yellow, decompose and age. Therefore, it is necessary to find a suitable temperature range. For different materials, the temperature range also needs to change. For example, a temperature as low as 190° C. is not suitable for PA or PC that has a higher melting point. The extrusion die coats the extruded hot-melt resin on a surface of the coating guide roller 4 to form a hot-melt resin film with uniform thickness. The coating guide roller 4 rotates to synchronously coat the hot-melt resin film on the flattened unidirectional continuous fibers 1. A ration speed of the coating guide roller 4 is set such that a linear speed of a roller surface is smaller than a running speed of the fiber. In this embodiment, the linear speed of the surface of the coating guide roller 4 is 6-10 m/min, and the running speed of the fiber, that is, a traction speed is 15-25 m/min. In addition, the coating guide roller 4 is connected to a heating device. In this embodiment, a heat transfer oil is used. The heat transfer oil is controlled by an oil temperature controller. A heating temperature is set to 200-250° C. Similarly, when different resin materials are selected, the temperature range is different, and the temperature needs to be adjusted according to the material.

Figure 10:
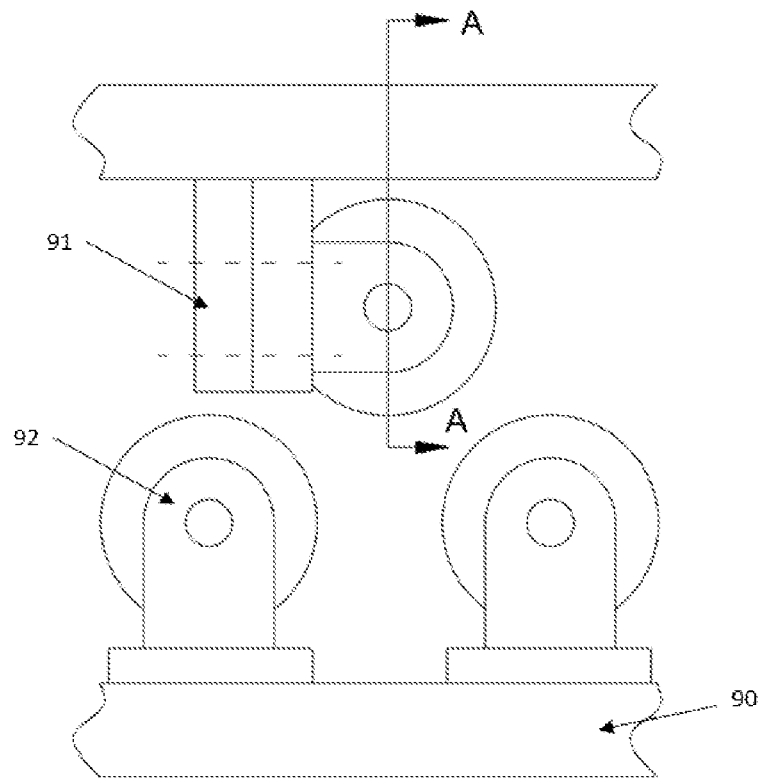
FIG. 10 is a front view of a position adjustment of the upright-triangle dip-coating unit in accordance with an embodiment of the present disclosure.
Figure 11:
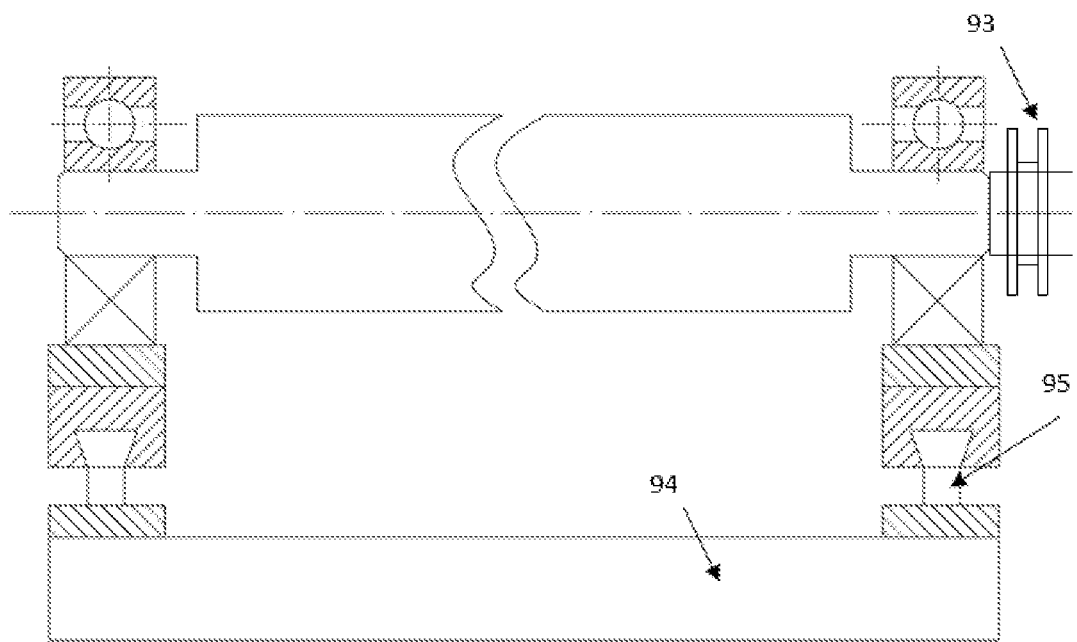
FIG. 11 is a side view of the position adjustment of the upright-triangle dip-coating unit in accordance with an embodiment of the present disclosure.

In this embodiment, after being preliminarily combined with the hot-melt resin at the coating guide roller 4, the flattened unidirectional continuous fibers 1 enters the open dip-coating roller device to finish an effective combination of the hot-melt resin and fibers. Each roller in each dip-coating unit is fixed by a support 90 and a bearing socket 92 as shown in FIG. 10, and each roller is connected to a linear motion pair 91 and an adjustment device 95 shown in FIG. 11. The adjustment device 95 is configured to adjust a center distance of rollers in the dip-coating unit. In addition, similar to the coating guide roller, each dip-coating unit is equipped with a motor to control a rotation speed through a sprocket 93 shown in FIG. 11. In this embodiment, each roller in the dip-coating unit has is a roller-surface linear speed of 10-15 m/min, and is heated by a heat transfer oil. The heat transfer oil is controlled by an oil temperature controller. A heating temperature is set to 200-250° C. Similarly, when different resin materials are selected, the temperature range is different, and the temperature needs to be adjusted according to the material. With reference to the tension calculation when the fiber passing through the flattening unit, it can be concluded that when the continuous fibers 1 pass through the open dip-coating roller device, a tension of the continuous fibers 1 is gradually increased and a wettability of the continuous fibers 1 is gradually improved.

In this embodiment, under a drive force of a main traction, after being heated and infiltrated with the resin, the flattened unidirectional continuous fibers 1 continuously pass through the cooling device 7, the trimming knife 84, the traction device 85, the transition roller 86 and the winding device 87 to obtain a unidirectional continuous fiber-reinforced thermoplastic composite material. The cooling device includes four pairs of rollers with cooling water. The cooling water is controlled by a chiller, and a water temperature can be adjusted. One roller of each pair of rollers is controlled by a cylinder to move up and down. An air pressure in the cylinder can be adjusted to adjust a pressure during cooling. A traction speed determines the running speed of the fibers. The traction device includes a steel roller and a rubber roller, and a rotation speed of the traction device is controlled by a motor. The transition roller before winding includes a plurality of rollers, and is configured to flat a product to prevent lateral waves or wrinkles. The winding device provided herein adopts a double-station winding method. The two stations can be turned over, and are controlled by a constant tension or constant torque motor.

Embodiment 2

A plurality of continuous fiber rolls loaded on a creel 80 becomes continuous fibers 1 arranged in a row after passing through a carding frame 81. The continuous fibers 1 passes through a first flattening unit 21, a second flattening unit 22, a third flattening unit 23, a heating mechanism 82 and a friction fiber electrification device 83 to be uniformly dispersed, and then passes through a coating guide roller 4 and an open dip-coating roller device to be fully infiltrated with a thermoplastic molten resin extruded by an extruder. Then the infiltrated continuous fibers are then cooled through a cooling device 7, and remove an edge through a trimming knife 84, and then pass through a traction device 85, a transition roller 86 and a winding device 87 to obtain a final product of a unidirectional continuous fiber-reinforced thermoplastic prepreg coil.

In this embodiment, the continuous fiber is a carbon fiber, the resin is PA66. A temperature of the extruder from a screw rod to an extrusion die is 240-310° C. A temperature of the coating guide 4 and the open dip-coating roller device is 260~300° C. A traction speed is 10-15 m/min. A roller-surface linear speed of the coating guide roller 4 is 5-7 m/min. A roller-surface linear speed of the open dip-coating roller device is 7-10 m/min. Before the cooling, a roller-surface linear speed of a non-traction roller is smaller than the traction speed, that is, a running speed of the fiber. If the roller-surface linear speed of the non-traction roller is the same as the traction speed or larger than the traction speed, broken fine hairiness of the fiber will be entangled on the roller surface, and the accumulation will increase and affect the production. Whereas when the roller-surface linear speed of the non-traction roller is smaller than the traction speed, since the running speed of the continuous fibers speed is faster than a roller-surface linear speed of a hot roller in contact with the fiber, the roller surface and the fiber move with respect to each other, and even if the hairiness are entangled on the roller surface for a moment, the continuous fiber can quickly take away the broken hairiness, avoiding further entanglement.

Figure 1A:
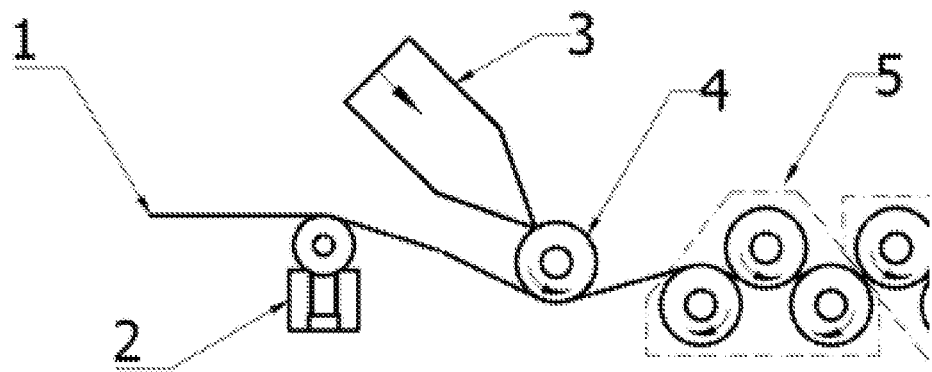
FIG. 1a schematically depicts that an extrusion die and a coating guide roller are arranged at one side of the continuous fiber in accordance with an embodiment of the present disclosure.

As shown in FIG. 1*a*, a difference from Embodiment 1 is that an extrusion die 31 and a coating guide roller 41 are arranged below the continuous fibers 1. The extrusion die 3 and the extrusion die 31 uniformly coat the hot-melt resin on the coating guide roller 4 and the coating guide roller 41, respectively, and the hot-melt resin is further coated on the continuous fibers 1 through a rotation of the coating guide roller 4 and the coating guide roller 41. Such arrangement is conducive to further infiltration.

Figure 1B:
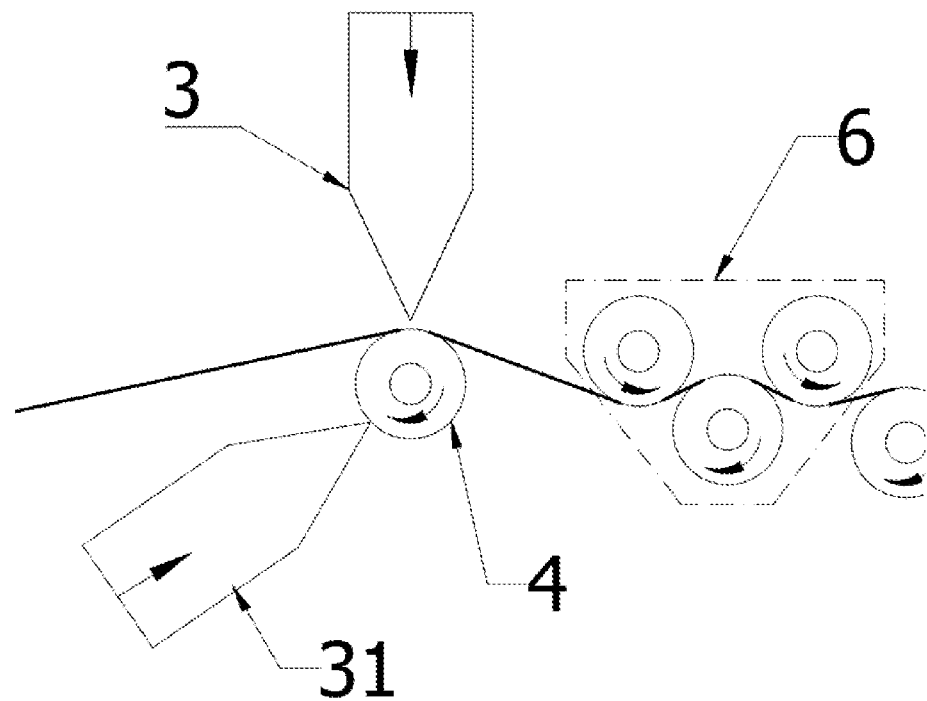
FIG. 1b schematically depicts that extrusion die are arranged at a top side and a bottom side of the continuous fiber, respectively and a coating guide roller is arranged at the bottom side of the continuous fiber in accordance with an embodiment of the present disclosure.

As shown in FIG. 1*b*, in another embodiment, an extrusion die 31 is arranged below the continuous fibers 1. The extrusion die 3 above the continuous fibers 1 coats the hot-melt resin on the continuous fibers 1, and the extrusion die 31 uniformly coats the hot-melt resin on the coating guide roller 4. The hot-melt resin is further coated on the continuous fibers 1 through a rotation of the coating guide roller 4.

Figure 1C:
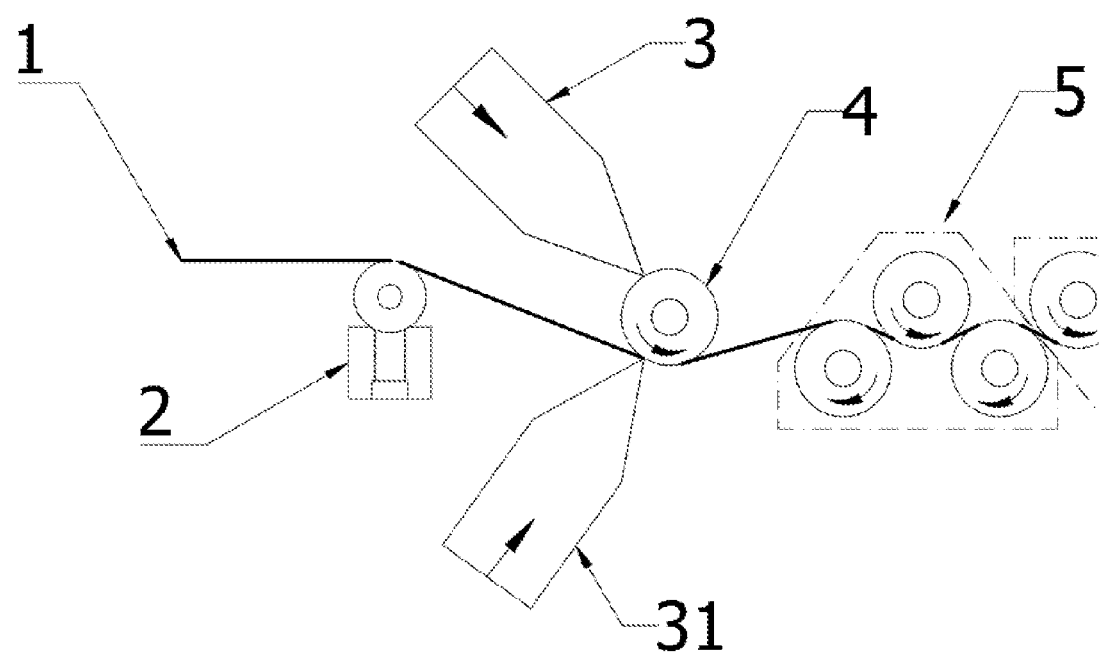
FIG. 1c schematically depicts that extrusion dies are arranged at a top side and a bottom side of the continuous fiber, respectively and a coating guide roller is arranged at the continuous fiber top side of the continuous fiber in accordance with an embodiment of the present disclosure.
Figure 2:
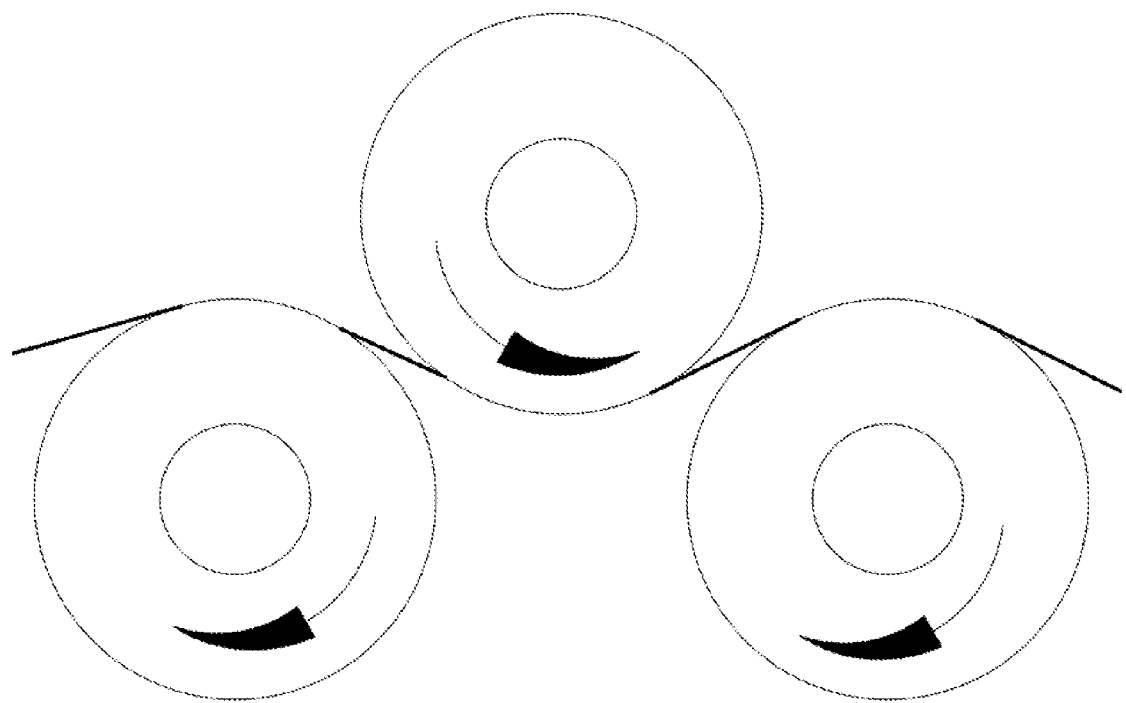
FIG. 2 schematically depicts a structure of coating guide rollers in an upright-triangle dip-coating unit in accordance with an embodiment of the present disclosure.
Figure 3:
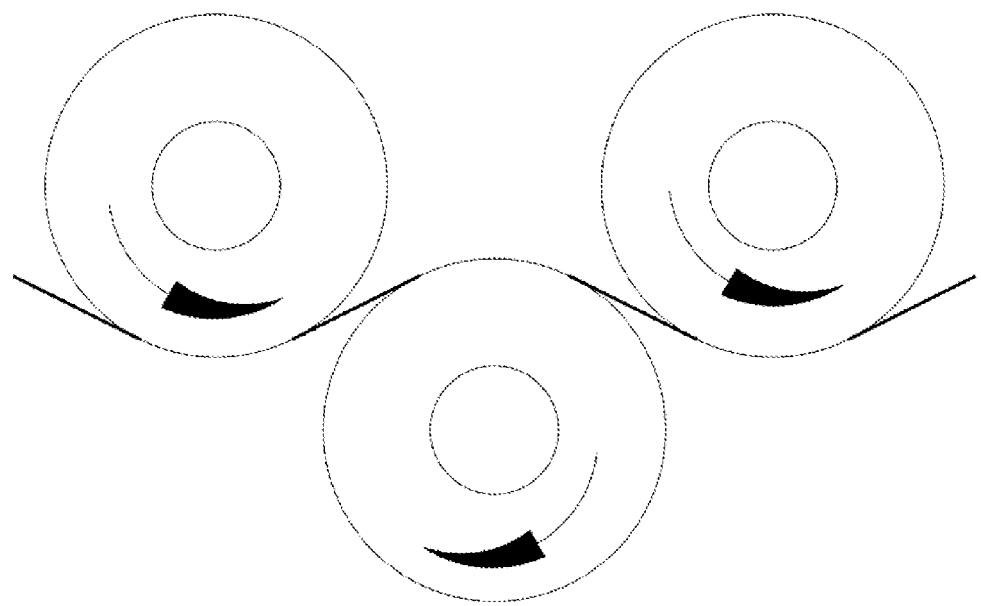
FIG. 3 schematically depicts a structure of coating guide rollers in an inverted-triangle dip-coating unit in accordance with an embodiment of the present disclosure.

As shown in FIG. 1*c*, in another embodiment, an extrusion die 31 is arranged below the continuous fibers 1. The extrusion die 3 above the continuous fibers 1 coats uniformly coats the hot-melt resin on the coating guide roller 4. The hot-melt resin is further coated on the continuous fibers 1 through a rotation of the coating guide roller 4. The extrusion die 31 below the continuous fibers 1 uniformly coats the hot-melt resin on the continuous fibers 1.

Embodiment 3

Preparation of a Unidirectional Fiber-Reinforced Resin Sheet with a Set Length

Figure 12:
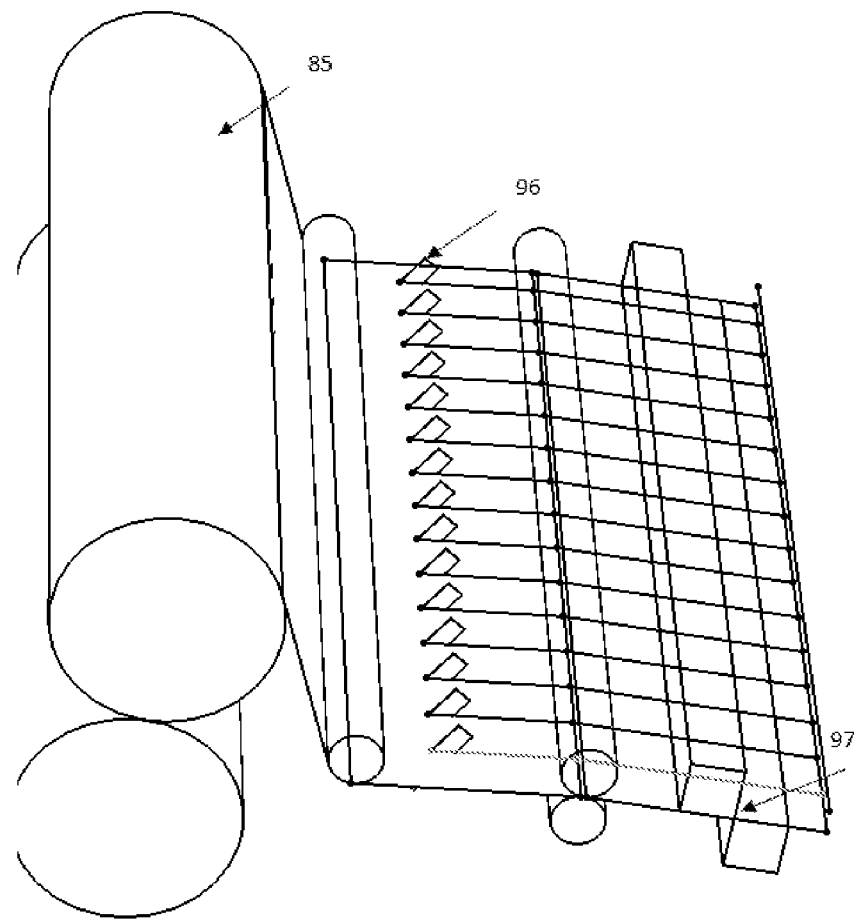
FIG. 12 schematically depicts a preparation of a unidirectional fiber-reinforced resin sheet in accordance with an embodiment of the present disclosure.

As shown in FIG. 12, the preparation method used herein is the same as the preparation method used in Embodiments 1 and 2. After passing through the traction device 85, a unidirectional continuous fiber-reinforced resin composite material is obtained. The unidirectional continuous fiber-reinforced resin composite material continuously passes through a longitudinal cutting device, and is evenly cut along a width direction. The cut composite material then passes through a transverse cutting device 97, and is cut down according to a set length to obtain the unidirectional fiber-reinforced resin sheet with the set length.

The embodiments of the present disclosure are described in detail above. It should be understood that modifications and changes made by those skilled in the art without sparing creative work should fall within the scope of the present disclosure defined by the appended claims.

What is claimed is:

1. A method for making a unidirectional continuous fiber-reinforced thermoplastic composite material, the method comprising:
   S1: loading a plurality of continuous fiber bundles on a carding device through a yarn-releasing rotating shaft configured to adjust a tension of each continuous fiber respectively; and subjecting the plurality of fiber bundles to fluffing through a heating mechanism; wherein the yarn-releasing rotating shaft is arranged on a creel;
   S2: uniformly spreading the plurality of continuous fiber bundles along a convex geometric surface of a yarn-passing part through a tension action of a flattening device; and passing the plurality of continuous fiber bundles through a friction fiber electrification device for further spreading through generating a repulsive force between adjacent fibers generating the same kind of charge, so as to obtain flattened unidirectional continuous fibers;
   S3: extruding a hot-melt resin through an extrusion die and coating the hot-melt resin on a coating guide roller to form a hot-melt resin film with uniform thickness on the coating guide roller;
   S4: rotating the coating guide roller; and coating the hot-melt resin film on the flattened unidirectional continuous fibers;
   S5: passing the flattened unidirectional continuous fibers through an open dip-coating roller device to fully combine the flattened unidirectional continuous fibers with the hot melt resin, wherein the open dip-coating roller device comprises a plurality of triangle-shaped dip-coating units, each of the plurality of triangle-shaped dip-coating units comprises three dip-coating rollers; the three dip-coating rollers are parallel to each other along an axial direction of each of the three dip-coating rollers; according to an arrangement of the three dip-coating rollers, the plurality of triangle-shaped dip-coating units are divided into an upright-triangle dip-coating unit and an inverted-triangle dip-coating unit a center distance of the three dip-coating rollers in each of the plurality of triangle-shaped dip-coating units is adjusted through adjusting a position of a middle dip-coating roller of the three dip-coating rollers; a gap between a roller surface of the middle dip-coating roller and a roller surface of a dip-coating roller adjacent to the middle dip-coating roller of the three dip-coating rollers in each of the plurality of triangle-shaped dip-coating units is 0.1-15 mm; and
   S6: passing the flattened unidirectional continuous fibers through a cooling and forming device under a driving force of a main traction to obtain a rollable unidirectional continuous fiber-reinforced thermoplastic composite material.

2. The method of claim 1, wherein in step S6, after being cooled and formed, the unidirectional continuous fiber-reinforced thermoplastic composite material is drawn through a longitudinal cutting device, and is evenly cut along a width direction of the unidirectional continuous fiber-reinforced thermoplastic composite material; and a cut unidirectional continuous fiber-reinforced thermoplastic composite material passes through a transverse cutting device, and is cut down according to a set length to obtain a unidirectional fiber-reinforced resin sheet with the set length.

\* \* \* \* \*